April 12, 1949.  C. O. MORRIS  2,466,997

CABLE CONNECTOR

Filed May 5, 1945

INVENTOR.
CHARLES O. MORRIS
BY
ATTORNEY

Patented Apr. 12, 1949

2,466,997

UNITED STATES PATENT OFFICE 2,466,997

CABLE CONNECTOR

Charles O. Morris, Van Nuys, Calif., assignor to The Garrett Corporation, Airesearch Manufacturing Company Division, Los Angeles, Calif., a corporation of California Application May 5, 1945, Serial No. 592,149

5 Claims. (Cl. 173—328)

This invention relates to connecting devices and especially to those for connecting cables. More particularly, the invention is concerned with connecting two electric cables together.

It is an object of this invention to provide a device of this sort so constructed that it can be easily manipulated in order to effectuate a rapid but positive connection of two electric cables in end to end alignment and which will also provide for an equally easy and rapid disconnection of the cables. The connecting device will hence be especially well suited, among its many other advantages, for employment in making those electrical connections which are commonly referred to as "emergency splices."

In furtherance of the foregoing object, it is an object of the invention to provide a cable connector which can be made to include two separable main portions, one of which at or near the junction of the portions, incorporates a novel externally contracting gripping device in a socket, and the other of which portions, at the junction end thereof, includes a post having means for actuating said gripping device to cause it to be gripped thereby, each portion, at the end opposite the joint established thereby, also including a novel anchorage for the inserted cable end. The complementary gripping devices are so constructed as to establish a structural joint and electrical contact of the main portions of such a nature that the entire surface of the gripped member will be firmly seized by the gripping member to set up a union between these two portions that can be terminated only by direct and positive manipulation of the parts, but which manipulation will be simple and easy to perform.

It is another object of the invention to provide a cable-end connector in which the joint between the two main portions of the connector, as well as both the anchorages for the two cable ends, will be established without the employment of solder or any other such material. Notwithstanding the absence of solder, brazing metal, or other such attaching material, the invention provides a physically strong and electrically satisfactory anchorage for the cable ends as well as a quickly connectible and disconnectible joint between the anchored cable ends.

In furtherance of the foregoing object, it is also an object of the invention to provide a cable connector including two separable main portions, in which each such portion will include a separable end-member incorporating means for anchoring and forcefully gripping substantially every unit of area of an inserted cable end, yet from which means the cable can be easily removed whenever it is desired. It can be removed, however, only by direct and positive manipulation of the anchorage, and when not so manipulated, these means constitute a secure and reliable anchorage for the cable end without the use of solder or the like.

Instead of employing two separable main portions, one having a post for engagement by gripping means on the other half, the invention contemplates that the connector may instead include a cylindric central member having a hollow, longitudinally slotted post protruding from each of the two opposite faces thereof, the exterior surface of each post preferably bearing a spiral wedge, and each post being surrounded by a sleeve the interior surface of which bears a complementary spiral wedge, the organization being such as to adapt the hollow post to be radially contracted around the ends of the inserted cables to thereby establish both an anchorage and an electrical connection without the employment of solder or the like.

The invention also includes the concept of constructing the connecting device as a single main member of conducting material surrounded by insulating material arranged in a novel manner, the insulating material being constructed in the form of two easily separable portions, and each end of the conducting material being constructed with novel solderless cable-end anchoring means.

The other objects and advancements of the invention will be made manifest as this disclosure progresses.

Several of the presently preferred embodiments of the above and other inventive concepts are illustrated by way of example only in the accompanying drawings, but it is to be understood that the invention is limited in the embodiments which it can take, only by the scope of the accompanying claims.

In these drawings.

All the connectors illustrated include an electrically conducting body; cable gripping means associated with the body at at least one end thereof; means associated with the cable gripping means to actuate same to seize or release the cable, as desired; and an insulating cover for the body.

Figure 1:
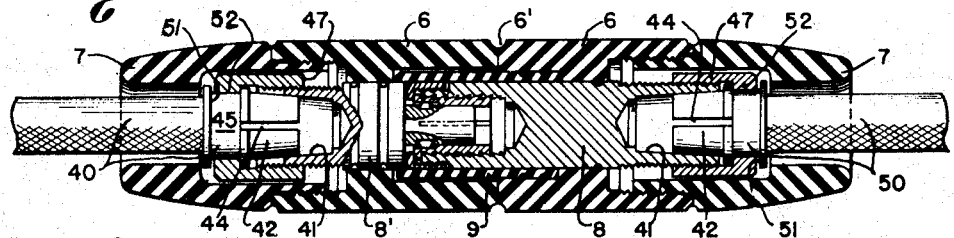
Fig. 1 is a substantially central longitudinal section of one of the connectors of this invention.
Figure 2:
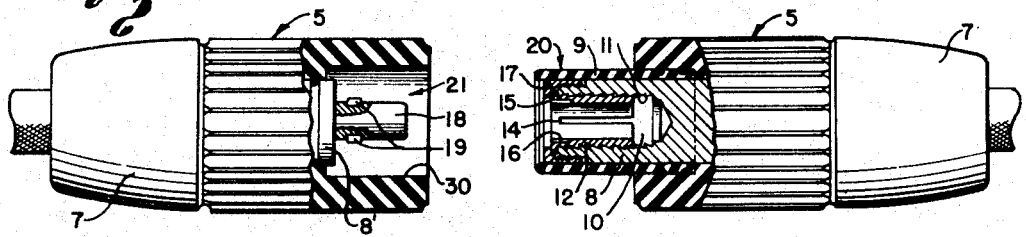
Fig. 2 is a view of the connector in disconnected condition, parts thereof being in fragmentary section.

In Fig. 1 the construction includes two portions 5, each of which constitutes in effect substantially one-half of the connector article. These main portions are so constructed as to join and meet on a line 6' substantially at the longitudinal center of the connector article. Each portion 5 has a shell 6 of an insulating nature and preferably of a plastic composition. One portion contains an electrically conducting body 8 extending substantially axially thereof and terminating a considerable distance beyond the junction face of the shell 6. The other portion also contains an electrically conducting body 8', the inner end of which terminates inside the end of the surrounding shell. This shell contains a socket 30, and projecting from the other shell and surrounding the conductor portion is an insulating sleeve 9, adapted to fit into the socket 30 for guiding the portions 5 together.

Each portion 5 includes a removable end cap 7 guiding a cable end inwardly of the concerned end of the connector article. Each end cap fits over or surrounds a cable gripping construction which includes a socket 41 in the outer end of each of the conducting members 8 and 8'. This socket has an inwardly convergent interior surface, as shown, and seated in this socket in engagement with this surface is a contractile sleeve 45 of cylindrico-conical configuration. The conical part 42 of the sleeve 45 bears a longitudinal slot 44 extending therethrough, and diametrically opposed thereto is another slot extending the full length of the sleeve member. The sleeve is provided with an annular groove 51, defined between flanges on the conical portion and on the outer portion, respectively of the sleeve. A hooded nut 47 is provided to surround the metallic conductor in threaded engagement therewith and has an inwardly extending annular flange 52 adapted to engage one or the other of the sleeve flanges, according as the member 47 is set up upon or backed off. When it is set up upon, the flange 52 forcefully engages the flange on the conical portion of the sleeve and urges the sleeve inwardly, the contractile nature thereof causing contraction of the sleeve around the inserted end of the cable.

It is intended that the cable ends be anchored in this manner before the portions 5 are locked together to establish the novel solderless joint of the present invention. The construction for effectuating this joint comprises a socket 10 of generally cylindrical configuration, formed in the inner end of the metallic conductor 8. The interior surface of this socket is provided with a spiral wedge 11 occupying the full longitudinal extent thereof if desired. Mounted in the socket in engagement with the spiral wedge is a movable sleeve 12 having a complementary spiral wedge on its exterior surface and having diametrically opposed slots, one of which is indicated at 14, extending longitudinally thereof. The sleeve 12 also is provided with a flanged head 15 which is normally seated in the end of member 8, as shown. Keyways 16 are also provided in the end of the sleeve and on the outer periphery of the member 8 in this region is mounted a hooded nut 17 for preventing movement of the sleeve 12 out of the socket. The other main portion of the connector, at the corresponding end thereof, bears a cylindrical post 18 located in socket 30, and preferably integral with conductor 8', but in any event, in electrical circuit therewith. Preferably near the root of this post are provided two keys 19, located and constructed to adapt them to engage in the keyways 16 on occasion.

When the portions 5, bearing the anchored cable ends, are aligned and urged towards each other, the member 9 enters the socket 30, and post 18 enters the sleeve 12 sufficiently for the keys 19 to fully engage in the keyways 16. With the parts in this position, rotation of portions 5 in relatively opposite directions will, by means of the keyed engagement, thread the sleeve 12 inwardly of its socket and cause the threads on the sleeve to coact with the threads on the socket wall with a wedging action. By virtue of the complementary spiral constructions, there will thereby be set up a multitude of forces acting radially inwardly along the full length of the sleeve 12 against the full surface of the post 18 which will be positively and firmly seized by all portions of the interior surface of the sleeve 12.

There is thereby effected a union or connection between the parts 5, which is not only established over a wide area of firm contact, and therefore has a low electrical resistance, but a solderless joint, which can be terminated only by direct and positive manipulation of the parts, is set up. As has been made manifest however, the manipulation required either to establish this joint or to disconnect the portions 5, are exceedingly simple and require little physical effort. It is also apparent that an unusually good electrical connection and contact are established, but in a manner entirely obviating the presence of solder, brazing material, or similar materials used in establishing a connection.

For the purpose of identifying the two groups of holding devices, the cable end gripping means are designated by numerals 40 and 50, and the joint establishing means are designated in groups by the reference numerals 20 and 21.

Figure 3:
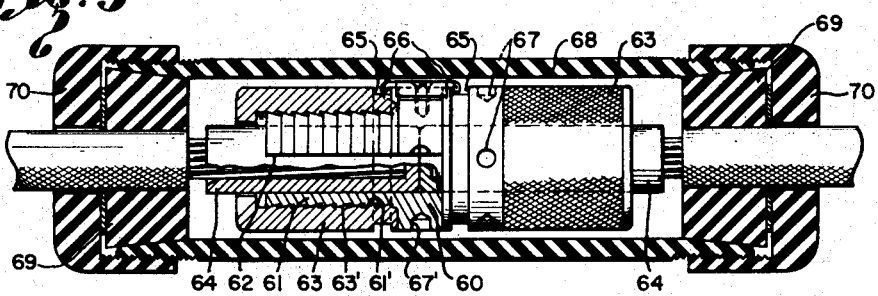
Fig. 3 is a longitudinal substantially central section of another embodiment of the invention, certain parts thereof being shown in side elevation.

The embodiment illustrated in Fig. 3 includes a body portion 60, located substantially centrally of the cable connector and made of an electrically conducting material. Extending outwardly from each of the opposite faces of the portion 60 is a contractile post 61, the outer surface of which bears a spiral wedge 61'. Each post bears two slots 62 extending therethrough and longitudinally thereof, at least one of these slots also extending through the body 60. Mounted on each post is a hooded contractor nut 63 bearing a complementary spiral wedge 63' in contact with the other spiral wedge. A cable end, bearing a thimble 64 of conducting material, is adapted to be inserted into each post. The contractor nut is adapted to be set up in abutment against the central portion 60 to cause the spiral wedge 63' to reach upon the spiral wedge 61'. There will thereby be set up a multitude of inwardly radially acting forces from the posts 61 onto the thimble 64, each contractile post yielding radially throughout its entire length sufficiently to establish a secure physical and electrical contact between each post and the thimble.

An annular groove 65 is provided at the inner end of each of the actuator nuts 63, and a pair of limiter fingers 66 is secured to the periphery of the body portion in a rigid manner as by means of the screw shown. The latter construction prevents the contractor nuts from backing off the posts under the influence of vibrations or other forces, tending to cause the nuts to rotate. Spanner wrench holes 67 are provided on the periphery of each actuator nut, and the central body portion may also be provided with spanner wrench holes 67'.

An insulating shell 68, here shown as cylindrical, surrounds the aforementioned structures, and is adapted to be closed at each end by an insulating cap 70 adapted to force a plug 69 into fluid-tight contact with the shell 68. The "either-end" spanner type connector thus provided, is well adapted for use in electro-magnetic circuits employed for degaussing steel ships, but is also well adapted for general emergency service. Easy access is had to the joint in the center of the article merely by removing the end caps and plugs whereupon the insulating shell 68 may be removed to permit the use of spanner wrenches as required.

Figure 4:
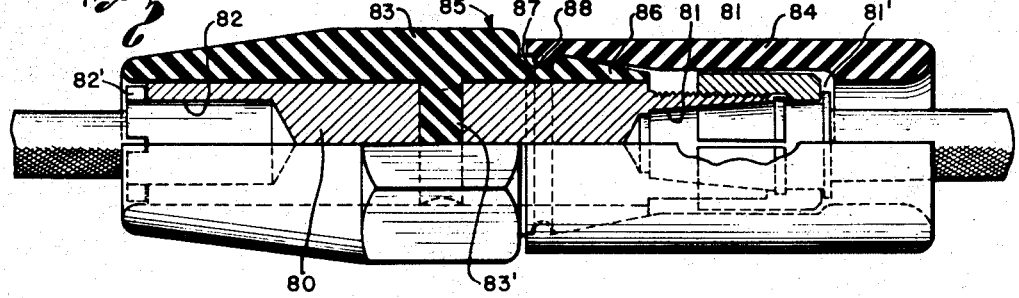
Fig. 4 is a view, half in longitudinal section and half in side elevation, of still another embodiment of the invention.

In Fig. 4 is illustrated an embodiment of the invention which is also of the solderless end-to-end type, and includes a metallic or other electrically conducting core 80 having a cable end gripping socket 81 in one end thereof, this socket including a cable gripper 81' substantially identical in principle with the one illustrated in Fig. 1. A socket 82 is formed in the other end of the metallic core for receiving a cable having on its end a sleeve with formations adapted to engage the notches shown at 82'. The sleeve is so constructed with reference to the cable end as to contract upon and grip the cable end when it is rotated sufficiently to meet a resistance from the notches 82'. The aforementioned parts are encased in an insulating cover as a whole, designated by the reference character 85. This cover includes two parts that overlap towards the center of the article and each portion 83 and 84 may well consist of regenerated rubber or the like. The portion 83 is cast or otherwise bonded onto the core 80, with an anchoring cylindrical extension 83' thereof passing through a cylindrical hole in the core 80. The portion 84 of the insulating cover is generally cylindrical in configuration with its inner end flared outwardly or converging inwardly as shown, where it overlies the fixed inner end 86 of the portion 83. The overlapping end of the portion 84 is provided with an annular protuberance 88, and the overlapped portion 86 of the member 83 is provided with a corresponding annular depression 87. Thus the cover portion 84 can be readily attached in place by sliding its inner end over the portion 86 until these coacting formations interengage. In order to separate the portions 84 and 83, it is found more convenient to hold the portion 80 by means of a wrench or the like, around the flats thereon, while applying a hand pull, aided if necessary by a lifting action on the other portion 84, thereby exposing the cable anchoring groove 81' for manipulation.

The embodiment just described provides a quick and positive way of making or breaking a circuit and may be used with standard or improved bus connectors, pothead hood nut adapters or quick disconnecting lugs.

I claim:

1. A cable connector comprising: a pair of complementary parts adapted to be releasably joined in end-to-end relation to connect and disconnect an electric flow path between cables connected to each part; current carrying means in one of said parts including an end projecting post-like member; current carrying means in the other of said parts including an element defining an open end socket adapted to receive said member endwise therein; means in said socket operable upon relative movement with respect to said element to grip the inserted member with a wedging action; and means for effectuating said relative movement in response to relative twisting of the joined parts.

2. A cable connector comprising: a pair of complementary externally insulated parts adapted to be releasably joined in end-to-end relation to connect and disconnect an electric flow path between cables connected to each part; current carrying means in one of said parts including an end projecting post-like member; current carrying means in the other of said parts including an open end socket adapted to receive said member endwise therein; contractible means supported for relative movement in said socket for engaging said inserted member; means responsive to said relative movement for actuating the contractible means into gripped and ungripped relation with respect to said member; and means including said member for effectuating said relative movement in response to relative twisting of the joined parts.

3. A cable connector comprising: a pair of externally insulated complementary parts adapted to be releasably joined in end-to-end relation to connect and disconnect an electric flow path between cables connected to each part; current carrying means in one of said parts including an end projecting post-like member; current carrying means in the other of said parts including an open end socket adapted to receive said member endwise therein; said parts in joined relation enclosing said current carrying means; a contractible sleeve rotatably mounted in said socket for engaging the inserted member; complementary spiral wedge surfaces between the sleeve and socket wall responsive to relative rotation thereof for causing contraction of the sleeve to grip the inserted member, whereby the current carrying means are connected and said parts retained against separation; and means including said member for effectuating said relative rotation in response to relative twisting of the joined parts.

4. A cable connector comprising: a pair of complementary parts adapted to be releasably joined in end-to-end relation to connect and disconnect an electric flow path between cables connected to each part; current carrying means in one of said parts including an end projecting post-like member; current carrying means in the other of said parts including an open end socket adapted to receive said member endwise therein; a contractible sleeve rotatably supported in said socket for engaging the inserted member; wedging means responsive to relative rotation between the socket wall and said sleeve for causing contraction of the sleeve to grip said inserted member; and means interconnecting said member in inserted position with the sleeve for unitary rotational movement, whereby relative rotation of said current carrying parts will effectuate contraction of said sleeve to form a pressure connection between the current carrying means of said parts and retain the parts against separation.

5. A cable connector comprising: a pair of complementary parts adapted to be releasably joined in end-to-end relation to connect and disconnect an electric flow path between cables connected to each part; current carrying means carried by one of said parts including an end projecting post-like member; current carrying means carried by the other of said parts including an open end socket adapted to receive said member endwise therein; a contractible sleeve rotatably supported in said socket for engaging the inserted member; wedging means responsive to relative rotation between the socket wall and said sleeve for causing contraction of the sleeve to grip said inserted member; and key means for interconnecting said member in inserted position with the sleeve for unitary rotational movement, whereby relative rotation of said current carrying parts will effectuate contraction of said sleeve to form a pressure contact between the current carrying means of said parts and retain the parts against separation.

CHARLES O. MORRIS.

REFERENCES CITED

The following references are of record in the file of this patent:

UNITED STATES PATENTS

| Number | Name | Date |
| --- | --- | --- |
| 1,153,580 | Sheppy | Sept. 14, 1915 |
| 1,667,485 | Macdonald | Apr. 24, 1928 |
| 1,819,651 | Metcalf, Jr | Aug. 18, 1931 |
| 1,935,061 | Richards | Nov. 14, 1933 |
| 2,059,008 | Marquart | Oct. 27, 1936 |
| 2,147,255 | Hoppenstand | Feb. 14, 1939 |
| 2,232,963 | Papp et al | Feb. 25, 1941 |
| 2,279,508 | Bergan | Apr. 14, 1942 |

FOREIGN PATENTS

| Number | Country | Date |
| --- | --- | --- |
| 79,416 | Denmark | Oct. 28, 1931 |
| 346,391 | Germany | Dec. 30, 1921 |